(12) United States Patent
Ingram et al.

(10) Patent No.: US 10,947,804 B2
(45) Date of Patent: Mar. 16, 2021

(54) METAL-TO-METAL ANNULUS WELLHEAD STYLE SEAL WITH PRESSURE ENERGIZED FROM ABOVE AND BELOW

(71) Applicant: Vetco Gray, LLC, Houston, TX (US)

(72) Inventors: Andrew Ingram, Houston, TX (US); Greg Dunn, Houston, TX (US); Alejandro Martinez, Houston, TX (US); Ronnie Hampton, Houston, TX (US); Joseph Pallini, Tomball, TX (US)

(73) Assignee: Vetco Gray, LLC, Houston, TX (US)

( * ) Notice: Subject to any disclaimer, the term of this patent is extended or adjusted under 35 U.S.C. 154(b) by 0 days.

(21) Appl. No.: 16/376,605

(22) Filed: Apr. 5, 2019

(65) Prior Publication Data

US 2019/0309593 A1 Oct. 10, 2019

Related U.S. Application Data

(60) Provisional application No. 62/653,721, filed on Apr. 6, 2018.

(51) Int. Cl.
*E21B 33/04* (2006.01)
*B23H 1/00* (2006.01)
*B23B 1/00* (2006.01)
*F16J 15/28* (2006.01)
*B33Y 80/00* (2015.01)

(52) U.S. Cl.
CPC ............... *E21B 33/04* (2013.01); *B23B 1/00* (2013.01); *B23H 1/00* (2013.01); *F16J 15/28* (2013.01); *B33Y 80/00* (2014.12)

(58) Field of Classification Search
CPC combination set(s) only.
See application file for complete search history.

(56) References Cited

U.S. PATENT DOCUMENTS

| 4,665,979 A | * | 5/1987 | Boehm, Jr. | ............. E21B 33/04 166/208 |
| 4,719,971 A | * | 1/1988 | Owens | ................. F16J 15/3204 166/191 |
| 4,742,874 A | * | 5/1988 | Gullion | ................. E21B 33/043 166/348 |
| 4,900,041 A | | 2/1990 | Hopkins | |
| 5,026,074 A | * | 6/1991 | Hoes | ....................... E21B 33/03 277/336 |

(Continued)

OTHER PUBLICATIONS

International Search Report and Written Opinion dated Jun. 17, 2019 in corresponding PCT Application No. PCT/US19/26047.

*Primary Examiner* — Cathleen R Hutchins
*Assistant Examiner* — Ronald R Runyan
(74) *Attorney, Agent, or Firm* — Hogan Lovells US LLP

(57) ABSTRACT

A system is disclosed as including a seal for sealing an area between a hanger and a housing of a wellhead. The seal is provided with at least a notch that defines at least a movable portion such as a wing or a lip. An e-ring is provided for a first energizing of the seal. The movable portion enables pressurized fluid from beneath the seal to cause the movable portion to protrude further against a mating side in the wellhead and the hanger for a second energizing of the seal. This type of seal maintains or improves the sealing of the wellhead in high pressure applications. Methods applied to the above seal are also disclosed.

20 Claims, 11 Drawing Sheets

(56) References Cited

U.S. PATENT DOCUMENTS

| | | | |
|---|---|---|---|
| 5,174,376 A * | 12/1992 | Singeetham | E21B 33/043 |
| | | | 166/208 |
| 7,467,799 B1 | 12/2008 | Tariton | |
| 9,376,882 B2 * | 6/2016 | Theiss | E21B 33/1285 |
| 10,745,992 B2 * | 8/2020 | Cheng | E21B 47/117 |
| 2003/0071187 A1 * | 4/2003 | Herren | F16F 15/0275 |
| | | | 248/638 |
| 2004/0017047 A1 | 1/2004 | Taylor | |
| 2008/0135229 A1 | 6/2008 | Hunter | |
| 2008/0203672 A1 | 8/2008 | Smith | |
| 2010/0126736 A1 | 5/2010 | Ellis | |
| 2010/0147533 A1 | 6/2010 | Nelson | |
| 2010/0327532 A1 | 12/2010 | Thomson | |
| 2013/0248199 A1 | 9/2013 | Gette | |
| 2014/0131054 A1 | 5/2014 | Raynal | |
| 2015/0114622 A1 | 4/2015 | Gadre | |
| 2018/0073319 A1 | 3/2018 | Ford | |

\* cited by examiner

METAL-TO-METAL ANNULUS WELLHEAD STYLE SEAL WITH PRESSURE ENERGIZED FROM ABOVE AND BELOW

CROSS-REFERENCE TO RELATED APPLICATIONS

This application is related to and claims priority from U.S. Provisional Application 62/653,721, titled METAL-TO-METAL ANNULUS WELLHEAD STYLE SEAL WITH PRESSURE ENERGIZED FROM ABOVE AND BELOW, filed Apr. 6, 2018, which is incorporated herein in its entirety by this reference.

BACKGROUND

Hangers, such as casing and/or tubing hangers, are used in offshore (subsea and surface) and onshore oil and gas rigs for various purposes. In an example, the casing hanger forms part of the wellhead and is lowered into the wellbore to an appropriate depth and rested on a shoulder inside the wellhead. The casing hanger may also be suspended in its position. The casing hanger may be provided for hanging the casing pipe. The casing hangers may be provided in a stack configuration, with narrowing internal diameters (IDs) to provide a shoulder for resting each subsequent casing hanger with subsequently smaller ID. The annulus between each casing hanger and housing is sealed. Such a seal provides a pressure and temperature-resistant seal between the hanger and the wellhead. The seal, however, must hold pressure from different directions and metal-to-metal (MS) seals may lack pressure-energization for pressure from below the seal (e.g., the annulus). Further complicated processes rely on creation of pressure-energization. For example, H-seal (or double U-cup seal) uses two e-rings (one above and one below) to create pressure-energization from top and bottom. In another application, a nose seal is provided for pressure-energization. However, such seals may have limited pressure capacity from the other directions. Even a shaped or tapered e-ring may be applied to squeeze the seal body harder when exposed to pressure, but this relies on movement of the seal for a limited amount of energization.

BRIEF DESCRIPTION OF THE DRAWINGS

Various embodiments in accordance with the present disclosure will be described with reference to the drawings, in which.

DETAILED DESCRIPTION

Figure 1:
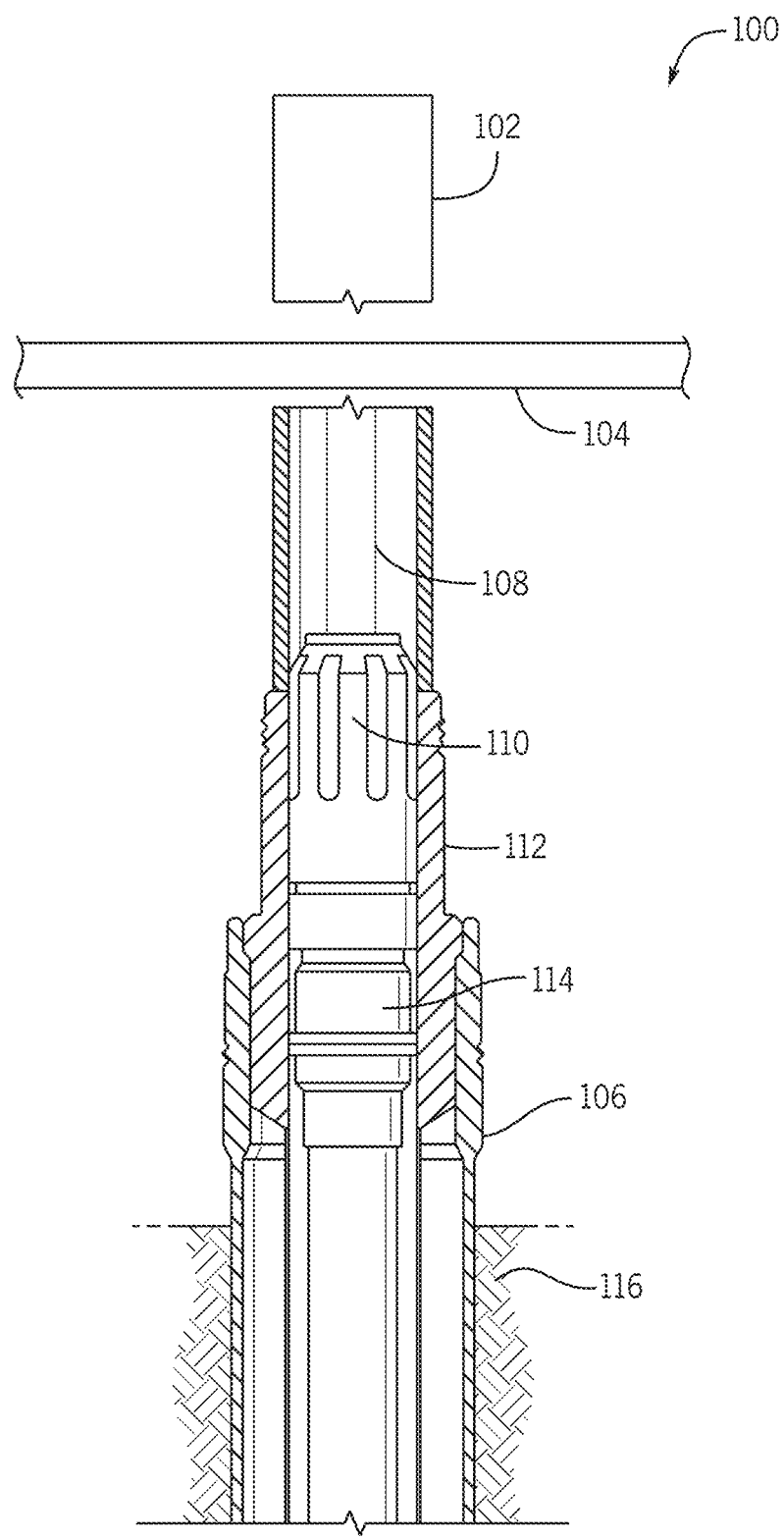
FIG. 1 illustrates an example of wellbore with casing hanger applied in a housing in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing seals that are capable of withstanding high temperature and high pressure. In particular, a feature is provided for seals to use mechanical energization that enable them to benefit from pressure to energize their sealing mechanism. In an example, a seal, such as a u-cup or u-seal, is provided for a wellhead. One or more notches in on or more sides of the seals provide one or more movable portions for the seal. For example, the one or more movable portions form a feature like a wing or a lip on the side of the seal. The one or more movable portions is at the bottom of the either or both of: the inside diameter of the seal and the outside diameter of the seal. The inside diameter is facing a surface of a hanger and the outside diameter is facing an inner diameter of the wellhead. When the seal is in place and energized by an energizing ring (e-ring) to form a first sealing for the wellhead, fluid under pressure from beneath the seal acts upwardly and pressurizes an area under the one or more notches. The pressure under the one or more notches causes the corresponding one or more movable portions of the seal to press against the internal diameter of the wellhead (and/or the surface of the hanger). This action of the one or more movable portions against the wellhead (and/or the surface of the hanger) causes a second sealing based at least in part on the pressurization of the area under the one or more notches. Casing or tubing hangers may both benefit from the present sealing structures.

While the seal may generally move during the energizing using an e-ring, the movable portion, as used throughout this disclosure is with reference to a seal having an additional movement capability defined by features that interface with the pressurized fluid from below the seal, the effect of which is utilized by such features to further mate seal areas of the seal against the wellhead and the hanger. Seals, such as wellhead annulus seals, hold pressure from multiple directions. MS-style seals are configured such that pressure from above the seal (the bore) energizes the sealing mechanisms by expanding the seal u-cup into the hanger and housing. However, the MS-style seal lack a similar pressure-energization from pressure below the seal (the annulus). For example, pressure from below the seal acts to squeeze the seal (such as a U-cup) and acts to reduce contact pressure on the hanger and housing. An enhancement to present seals, such as the MS-style annulus seal, is provided herein by features that take advantage of the pressure-energization from below the seal. The present features of a movable portion formed from notching specific areas of the seal (e.g., adjacent to the seal areas), provides sealing reliability when sealing pressure acts from below the seal, and especially when the sealing pressure is at high pressure. The present seal only requires a single energizing ring pushed in from above to first energize the entire seal because it causes the seal to expand against the hanger and housing, and but it then allows pressure to further energize the seal from both above and below the seal location. As the e-ring expands the U-cup radially there is no vertical movement of the seal.

As such, the wing or lip permits pressure to act from behind the sealing surface to increase its engagement against an inner surface of the wellhead (and/or the hanger), for instance. Such a second seal provides a second energization of the seal using fluid from within the wellhead. The pressurization and second energization increases the seal's reliability by maintaining the seal's engagement more consistently across a wider range of pressures, especially under high pressure of the fluid beneath the seal. The pressurization and second energization also reduces the initial mechanical force needed to maintain a seal at high pressures by reducing the pressure's effect to peel the seal away from its mating surface—e.g., the inner diameter of the wellhead and/or the surface of the hanger. The application of notches for receiving fluid to provide a second energizing of the seal may be applied to metal-to-metal seals (MS-style seals), so that they do not lose contact when sealing from below; thus, they would be pressure-energized from both above and below when applied.

Pressure-energized seals are more reliable over a wider range of pressures and tolerances than non-pressure-energized seals. Without pressure-energization, the seal mechanism must be held in place (e.g., be preloaded) with mechanical force, which is typically provided by the setting mechanism, such as the e-ring in MS-style seals. Higher pressure environments under sealing requirements benefit from more contact pressure and thus more mechanical preload from the e-ring. However, these high mechanical preloads translate into higher setting loads and greater deflections of parts interfacing the seal, such as the hanger and housing. A pressure-energized seal requires less initial contact pressure, which corresponds to less setting load and less system deflections. Looser tolerances may also be specified for mating the seal against the surfaces. The present disclosure, however, offers simplicity of no additional parts and no changes to operational procedures by focusing on machining portions of the seal to take advantage of pressure provided from below the seal. As the e-ring expands the U-cup radially there is no vertical movement of the seal.

Various other functions can be implemented within the various embodiments as well as discussed and suggested elsewhere herein.

FIG. 1 illustrates an example 100 of wellbore with a casing hanger applied in a housing, in accordance with various embodiments. In the example 100, region 116 may represent subsea or offshore environment with the wellbore penetrating the environment for oil and gas use. The low pressure wellbore housing 106 may include a wellhead 112, and tubing or casing hanger 114, which may be moved into place with a running tool 110. External wellhead support structure of the low pressure wellbore housing 106 (e.g., surface casing) supports the wellhead 112 and additional casings within the wellhead. Strings of pipes are provided to approach the required depth for placement and drilling. For example running string or landing string 108 may be used to place the hanger 114 in its position in the wellhead 112. In addition, a platform 104 may be available in example 100, where equipment in module 102 is provided for power, communication, and monitoring between the wellhead 112 and external structures. In an alternate implementation where a tubing hanger is at issues, a similar seal structure is available for tubing hangers. A person of ordinary skill would recognize, from the present disclosure, the requirements to enable the present seal to function with notches and movable portions in sealing the tubing hanger with a corresponding mating inner diameter of a corresponding mating surface.

A person of ordinary skill reading the present disclosure would recognize that such equipment in module 100 may comprise a power unit for providing power through the strings into the wellbore, but also for controlling the drilling into the wellbore. The power unit may be located near the strings, at about the center of the platform 104. In addition, the module 100 may include a communications outpost for providing communications to other units, such as a subsea electronics module (SEM). In addition, in subsea implementations, the platform 104 is at the surface of the sea, while the wellhead 112 and the SEM are located at subsea levels. The power unit may be coupled with the communications to allow for redundancy and singular cable transmission through the wellhead, while providing sufficient room for drilling via rotation of the appropriate strings—e.g., string 108.

Figure 2:
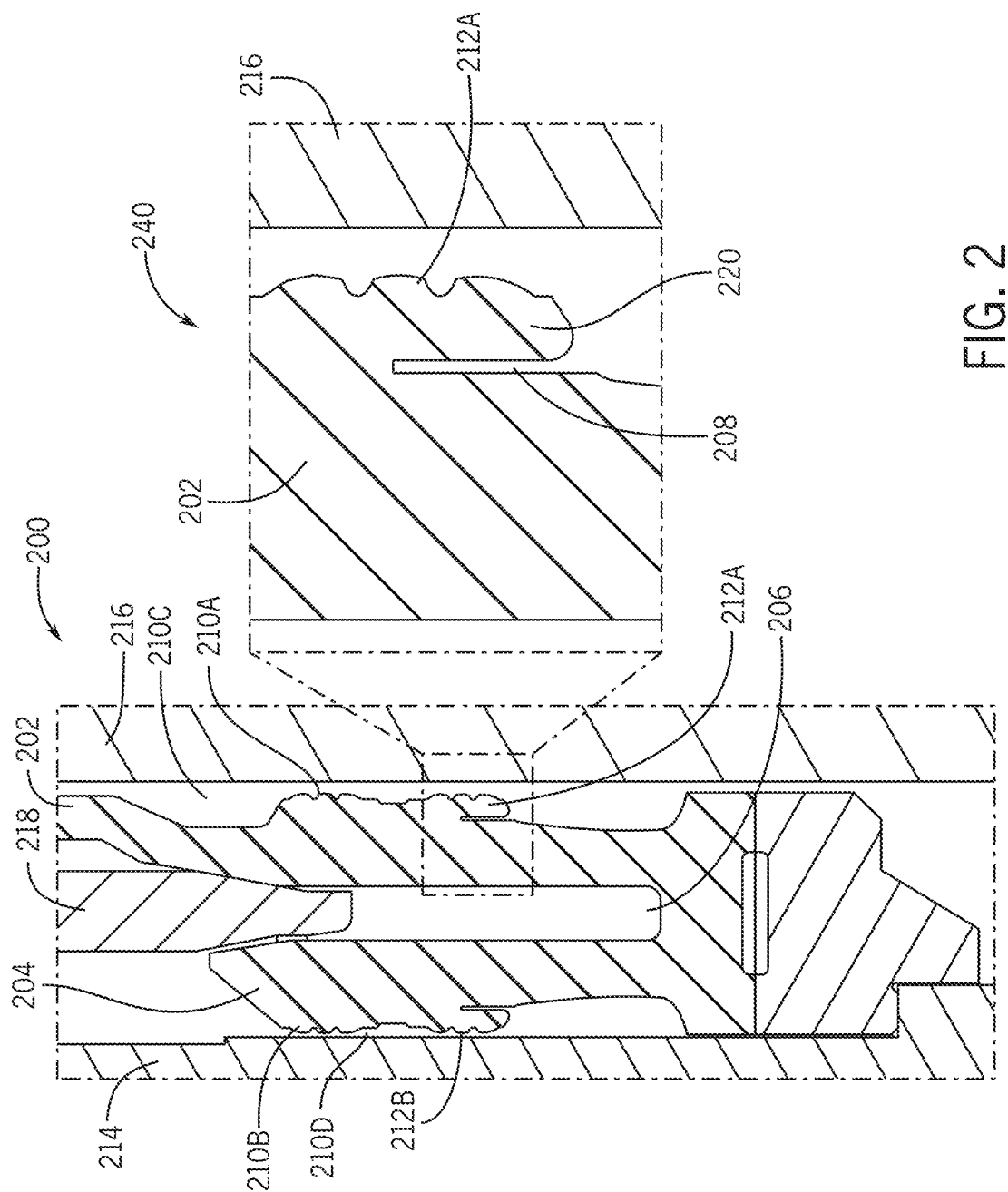
FIG. 2 illustrates an example of a seal including at least a notch form at least a movable portion, such as a wing or a lip, in accordance with an aspect of this disclosure.
Figure 10:
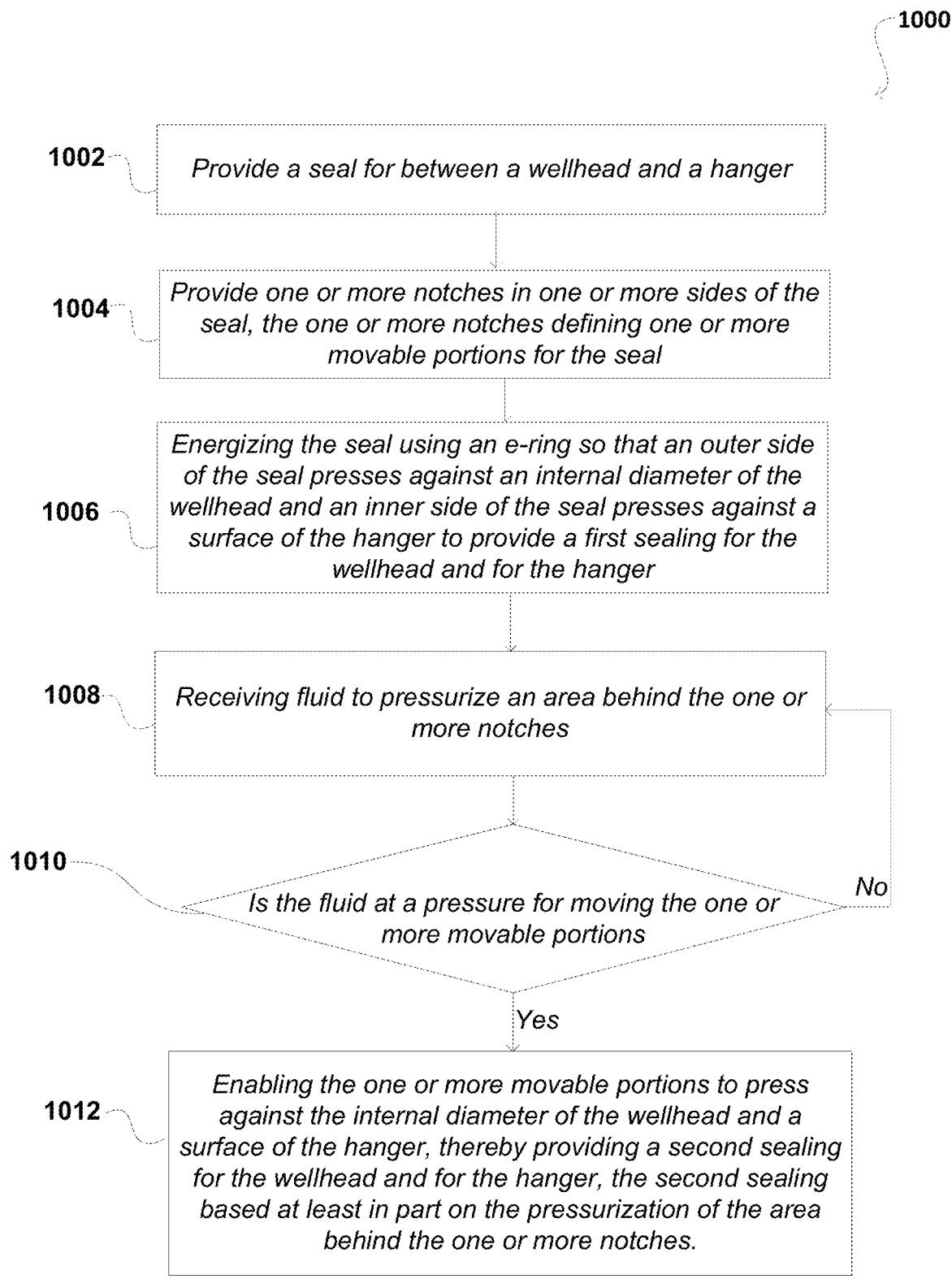
FIG. 10 illustrates a process of sealing using a seal that is modified by at least a notch that defines at least a movable portion, in accordance with an aspect of this disclosure.

FIG. 2 illustrates examples 200, 240 (exploded view of a portion of 200) of U-cups utilizing the present notch and movable portion in accordance with an aspect of this disclosure. The example 200 illustrates a U-cup with sections 202, 204 forming the U-cup. Particularly, example 200 may represent an exploded cross sectional side view of the area between the casing hanger 114 and the housing of the wellhead 112. The housing of the wellhead is represented by reference numeral 216 and the hanger, by reference numeral 214. As such, in this case, reference to a U-cup may be made by reference to one or more of sections 202, 204, unless otherwise indicated. FIG. 2 illustrates that the U-cup, including sections 202, 204, may be energized by an energizing ring (e-ring) 218 that is provided to be pushed into place with the U-cup such that sections 202, 204 are pushed outwardly from the center of the U-cup. Presently, FIG. 2 illustrates the e-ring partly applied and illustrates that outer seal areas or sides 210A, 210B, 212A, and 212B are not pressing against the surfaces of wellhead 216 and hanger surface 214. FIG. 10 provides an example of an e-ring when fully applied, along with high pressure energizing from below the e-ring that provides a second energizing and a second sealing. In an implementation, applied force and materials may be removed once the U-cup 202 is in place in the wellhead. Further, when energized (e.g., pressed into area 206 to position within the U-cup 202), the e-ring 218 causes the outer seal areas or sides 210A, 210B, 212A, and 212B for the ported U-cup 206 to press against the housing 216 on one side and the casing hanger 214 on the other side, thereby providing high temperature and high pressure seals in four different locations as illustrated in FIG. 2, and as further illustrated with respect to the other figures in this case. This is generally a first energizing of the e-ring and it provides at least a first sealing of the U-cup with wellhead and the casing.

In FIG. 2, even after the first grooves 210A, 210B of the U-cup 202 are energized using the above first energizing process with the e-ring, the lower grooves 212A, 212B allow for further movement of the lower portion of the U-cup seal, because they incorporate notch 208. FIG. 2 illustrates notch 208 in an exploded view 240. A similar notch as notch 208 is also understood, to a person reading the present disclosure, as provided on the inner part of the seal—adjacent to grooves 212B (unmarked, but illustrated). In an example, the grooves 212A, 212B are movable portions of the U-cup, as a result of the notch 208, even after the first energizing using the e-ring is completed. In an implementation, fluid from beneath the seal is received in the notches 208—throughout the circumference of the seal 202—and causes the movable portions forming grooves 212A, 212B to move outwardly from the center of the U-cup. This is additional movement that may not exist in grooves portion 210A, 210B. This additional movement provides second energizing for the U-cup and provides second sealing of the U-cup with the wellhead and the casing. This is particularly useful when higher pressures exist below the seal which acts to further push, outwardly, the movable portions forming grooves 212A, 212B.

FIG. 2 illustrates that pressure-energization of the seal 202 may be achieved by allowing pressurized fluid (e.g., in notch 208) to travel behind or beneath the portion of the seal containing grooves 212A, 212B. These grooves are also herein referred to as sealing mechanisms, and may alternatively include one or more of bumps, wickers, grooves, o-rings, and smooth-flush faces. The implementation of FIG. 2 uses predominantly grooves in the seal areas or sides 212A, 212B. Accordingly, reference numerals for the sides or areas of the seals may be interchangeably used with textures in the seal formed by or incorporating the bumps, the wickers, the grooves, the o-rings, and smooth-flush faces. Notch 208 may be appropriately provided so as to accentuate the location of the sealing mechanism—e.g., properly facing the inner diameter of the wellhead 216 or surface of the casing hanger 214. A fluid path formed by the notch 208 results in the seal mechanisms protruding outwardly to form a wing or a lip. When pressure acts on the wing or lip (movable portions 220, including seal areas with grooves 212A, 212B), the seal mechanism is pressed into its corresponding mating surface on the wellhead or casing hanger. Such an act may be by filling, entirely or partly, the fluid path following which the lack of further path causes the fluid to build pressure in the notch 208 to protrude the movable portions 220 including grooves 212A, 212B. This maintains or increases the contact pressure between the seal and the hanger and wellhead, and thus preserves a robust seal between these structures.

The sealing offered by the present mechanism of notching is further benefited by the creation of the wings or the lips 220 representing movable portions that include the grooves 212A, 212B. The movable portions 220 results in a seal that works at high pressures as the notch 208 is pressurized with fluid from below. In the absence of the present movable portions 220 formed as result of the notching and supporting grooves, high pressures may act to pry the seal (and sealing mechanism) away from its mating surface. Instead, the pressure-energization of the present implementations permits the seal to accommodate a wider range of tolerances because it adds compliance (e.g., movement) to the seal that permits more deflection of the seal, but without overstressing the seal. The added compliance also causes the wings or lips 220 to chase their mating surfaces—and to maintain the seal—as they deflect outwardly (or in sealing directions) due to pressure loads. In an example, such a seal many be an inner seal, so the sealing direction may be inwards rather than outwards. A person of ordinary skill, upon reading the present disclosure will recognize the direction applicable for sealing depending on the location of the mating surface, for instance.

Figure 3:
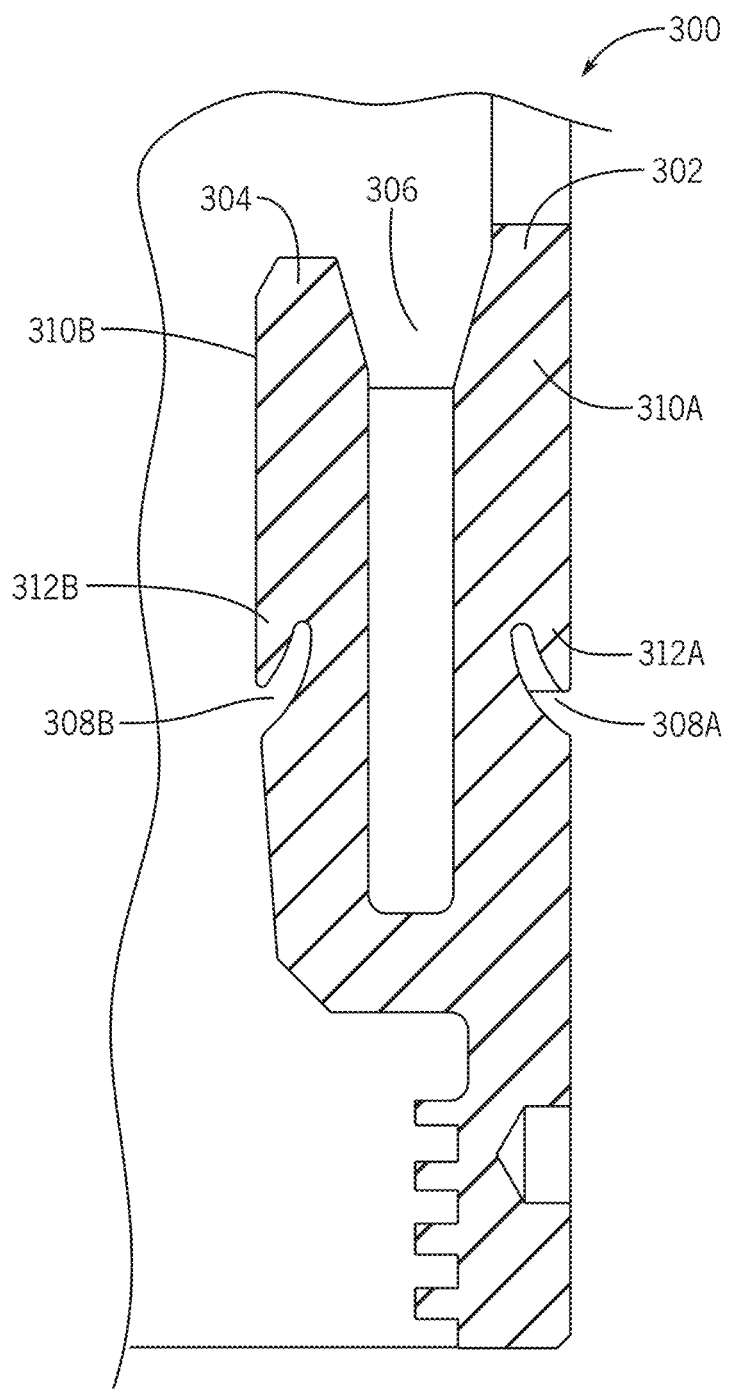
FIG. 3 illustrates another example of a seal including at least a notch that defines at least a movable portion, such as a wing or a lip, in accordance with aspects of this disclosure.
Figure 4:
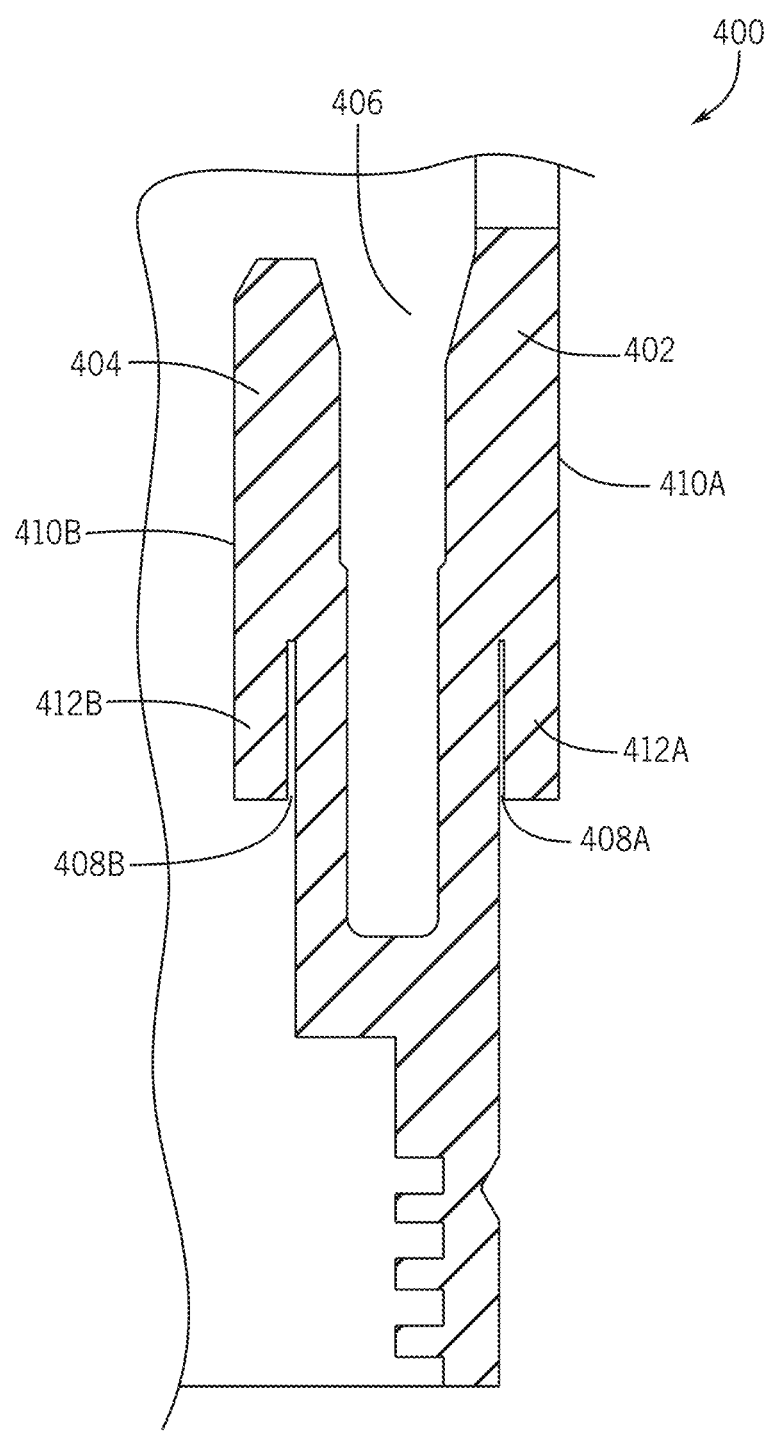
FIG. 4 illustrates yet another example of a seal including at least a notch that defines at least a movable portion, such as a wing or a lip, in accordance with aspects of this disclosure.
Figure 5:
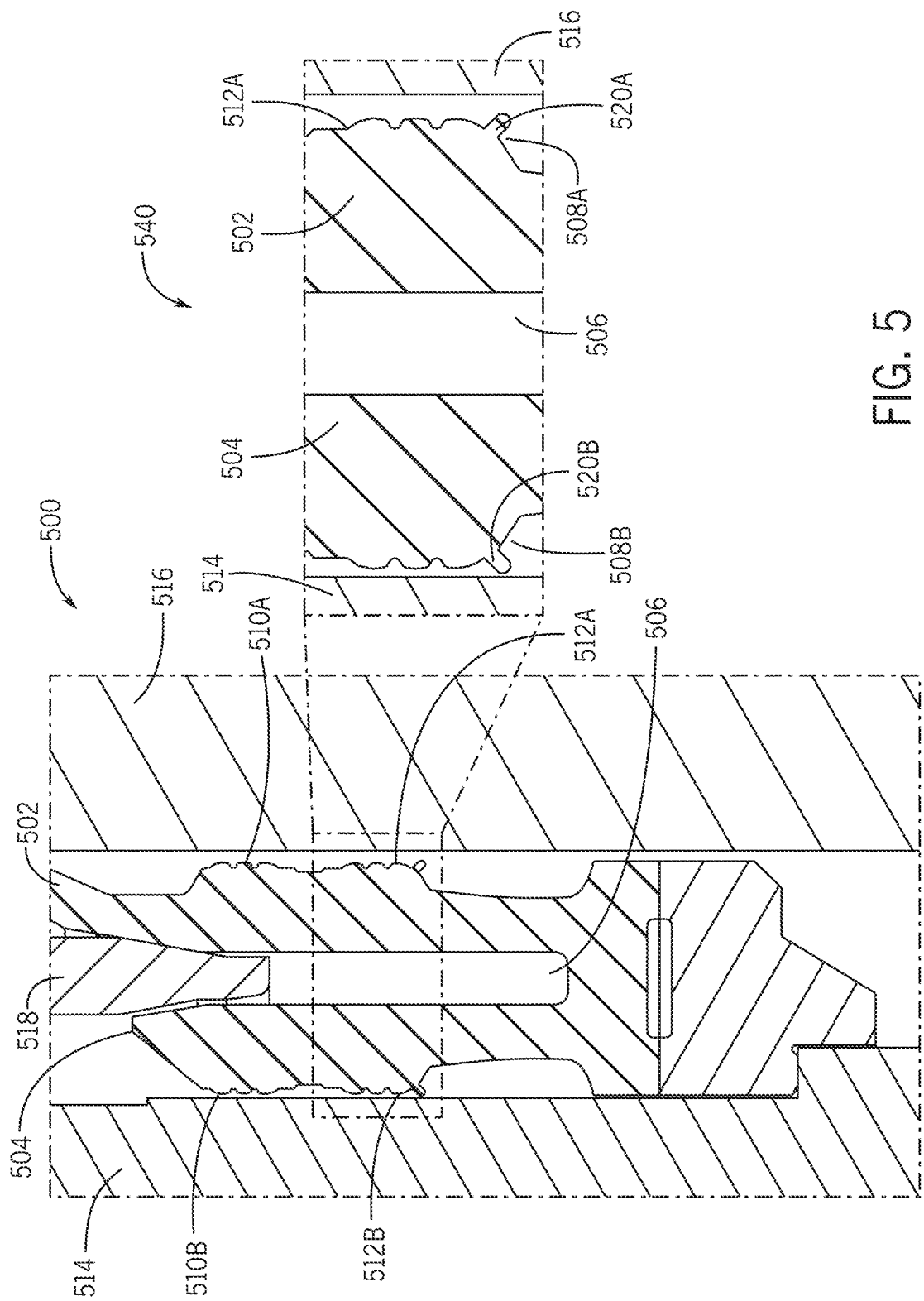
FIG. 5 illustrates yet another example of a seal including at least a notch that defines at least a movable portion, such as a wing or a lip, in accordance with aspects of this disclosure.

In an alternate implementation discussed with respect to other figures in this disclosure, the movable portion of the seal may be a protruding lip (e.g., FIGS. 3, 4, and 5). A notch, such as a thin slit or groove, cut behind some or all of the seal mechanism(s) provides the ability of the movable portion to more under the pressure of fluid—over the movement required by the e-ring of the first sealing process. The notch may be cut during the manufacturing of the material forming the seal. The notch may then be pressed to a smaller size, such as by hot rolling. Additional ports or grooves may be added to ensure that pressurized fluid can reach behind the sealing mechanisms. In a further aspect, the wing or lip is shaped with a predetermined amount of allowable movement or deflection, such that when such movement or deflection occurs, then the wing or lip contacts the seal and forms a bridge. Such an aspect works by altering the stiffness of the seal mechanism. The same effect can be achieved by inserting material (referred to herein as an insert) into the notch opening (e.g., FIG. 6A) to act as a spacer or by leaving a bulge of material (FIG. 6B) during the manufacturing process. The above-referenced features may be included in the seal via, but not limited to, one or more of: lath turning, face grooving, EDM, 3D printing, material forming processes, and rolling. Similar features might also be applied to other locations of a seal to enhance performance in other load cases.

FIG. 3 illustrates example 300 of a seal utilizing the present notch and movable portion in accordance with an aspect of this disclosure. The seal in example 300 may be a U-cup type with sections 302, 304 forming the U-cup. Particularly, example 300 may represent an exploded cross sectional side view of the area between the casing hanger 114 and the housing of the wellhead 112. As such, in this case, reference to a U-cup may be made by reference to one or more of sections 302, 304, unless otherwise indicated. FIG. 3 illustrates that the U-cup, including sections 302, 304, may be energized by an energizing ring (e-ring) in the same manner as illustrated in FIG. 2. The e-ring is provided to be pushed into place with the U-cup such that sections 302, 304 are pushed outwardly from the center of the U-cup. In an implementation, applied force and materials may be removed once the U-cup 302 is in place in the wellhead. Further, when energized (e.g., pressed into area 306 to position within the U-cup 302), the e-ring causes the outer seal areas or sides 310A, 310B, 312A, and 312B for the U-cup 306 to press against the housing on one side and the casing hanger on the other side, thereby providing high temperature and high pressure seals in four different locations similar to the illustrated example 200, 240 of FIG. 2, and as further illustrated with respect to the other figures in this case. This is generally a first energizing of the e-ring and it provides at least a first sealing of the U-cup with wellhead and the casing.

In FIG. 3, even after the first seal areas or sides 310A, 310B of the U-cup 302 are energized using the above first energizing process with the e-ring, the lower seal areas 312A, 312B allow for further movement of the lower portion of the U-cup seal, because they incorporate notches 308A, 308B. The notches 308A, 308B are adjacent to respective seal areas 312A, 312B. In an example, the seal areas 312A, 312B are movable portions of the U-cup, as a result of the notches 308A, 308B, even after the first energizing using the e-ring is completed. In an implementation, fluid from beneath the seal is received in the notches 308A, 308B—throughout the circumference of the seal 302—and causes the movable portions including seal areas 312A, 312B to move outwardly from the center of the U-cup. This is additional movement that may not exist in seal portion 310A, 310B. This additional movement provides second energizing for the U-cup and provides second sealing of the U-cup with the wellhead and the casing. This is particularly useful when higher pressures exist below the seal which acts to further push, outwardly, the movable portions forming seal areas 312A, 312B.

FIG. 3 illustrates that pressure-energization of the seal 302 may be achieved by allowing pressurized fluid to travel behind or beneath the portion of the seal containing seal areas 312A, 312B. These seal areas are also herein referred to as sealing mechanisms, and may alternatively include bumps, wickers, grooves, o-rings, and smooth-flush faces. FIG. 3 illustrates the smooth-flush faces in the seal areas 312A, 312B. As such, notches 308A, 308B may be appropriately provided so as to accentuate the location of the sealing mechanism—e.g., properly facing the inner diameter of a wellhead or surface of the casing hanger (e.g., similar wellhead and casing in FIG. 2). A fluid path formed in or by the notches 308A, 308B results in the seal mechanisms protruding outwardly to form a wing or a lip. When pressure of a fluid traveling in the fluid path acts on the wing or lip (the movable portions including seal areas 312A, 312B), the seal mechanism (including the seal areas 312A, 312B) is pressed into its corresponding mating surface on the wellhead or casing hanger. Such an act may be by filling, entirely or partly, the fluid path following which the lack of further path causes the fluid to build pressure in the notches 308A, 308B to protrude the movable portions including seal areas 312A, 312B. This maintains or increases the contact pressure between the seal and the hanger and wellhead, and thus preserves a robust seal between these structures. In addition, the seal 302 may be made of similar materials and from similar manufacturing processes as discussed with respect to the materials and the manufacturing processes used to form the seal 202 of FIG. 2.

FIG. 4 illustrates another example 400 of a seal utilizing the present notch and movable portion in accordance with an aspect of this disclosure. The seal in example 400 may be a U-cup type with sections 402, 404 forming the U-cup. Particularly, example 400 may represent an exploded cross sectional side view of the area between the casing hanger 114 and the housing of the wellhead 112. As such, in this case, reference to a U-cup may be made by reference to one or more of sections 402, 404, unless otherwise indicated. FIG. 4 illustrates that the U-cup, including sections 402, 404, may be energized by an energizing ring (e-ring) in the same manner as illustrated in FIG. 2. The e-ring is provided to be pushed into place with the U-cup such that sections 402, 404 are pushed outwardly from the center of the U-cup.

In an implementation, applied force and materials may be removed once the U-cup 402 is in place in the wellhead. Further, when energized (e.g., pressed into area 406 to position within the U-cup 402), the e-ring causes the outer seal areas 410A, 410B, 412A, and 412B for the U-cup 406 to press against the housing on one side and the casing hanger on the other side, thereby providing high temperature and high pressure seals in four different locations similar to the illustrated example 200, 240 of FIG. 2, and as further illustrated with respect to the other figures in this case. This is generally a first energizing of the e-ring and it provides at least a first sealing of the U-cup with wellhead and the casing.

In FIG. 4, even after the first seal areas 410A, 410B of the U-cup 402 are energized using the above first energizing process with the MS, the lower seal areas 412A, 412B allow for further movement of the lower portion of the U-cup seal, because they incorporate notches 408A, 408B. The notches 408A, 408B are adjacent to respective seal areas 412A, 412B. In an example, the seal areas 412A, 412B are movable portions of the U-cup, as a result of the notches 408A, 408B, even after the first energizing using the e-ring is completed. In an implementation, fluid from beneath the seal is received in the notches 408A, 408B—throughout the circumference of the seal 402—and causes the movable portions including seal areas 412A, 412B to move outwardly from the center of the U-cup. This is additional movement that may not exist in seal portion 410A, 410B. This additional movement provides second energizing for the U-cup and provides second sealing of the U-cup with the wellhead and the casing. This is particularly useful when higher pressures exist below the seal which acts to further push, outwardly, the movable portions forming seal areas 412A, 412B.

FIG. 4 illustrates that pressure-energization of the seal 402 may be achieved by allowing pressurized fluid to travel behind or beneath the portion of the seal containing seal areas 412A, 412B. These seal areas are also herein referred to as sealing mechanisms, and may alternatively include bumps, wickers, grooves, o-rings, and smooth-flush faces. FIG. 4 illustrates the smooth-flush faces in the seal areas 412A, 412B. As such, notches 408A, 408B may be appropriately provided so as to accentuate the location of the sealing mechanism—e.g., properly facing the inner diameter of a wellhead or surface of the casing hanger (e.g., similar wellhead and casing in FIG. 2). A fluid path formed in or by the notches 408A, 408B results in the seal mechanisms protruding outwardly to form a wing or a lip. When pressure acts on the wing or lip (the movable portions including seal areas 412A, 412B), the seal mechanism (including the seal areas 412A, 412B) is pressed into its corresponding mating surface on the wellhead or casing hanger. Such an act may be by filling, entirely or partly, the fluid path following which the lack of further path causes the fluid to build pressure in the notches 408A, 408 to protrude the movable portions including seal areas 412A, 412B. This maintains or increases the contact pressure between the seal and the hanger and wellhead, and thus preserves a robust seal between these structures. In addition, the seal 402 may be made of similar materials and from similar manufacturing processes as discussed with respect to the materials and the manufacturing processes used to form the seal 202 of FIG. 2.

FIG. 5 illustrates another example 500 of a seal utilizing the present notch and movable portion in accordance with an aspect of this disclosure. The seal in example 500 may be a U-cup type with sections 502, 504 forming the U-cup. Particularly, reference numeral 540 represents an exploded cross sectional side view of the area between the casing hanger 114 and the housing of the wellhead 112. The housing of the wellhead is represented by reference numeral 516 and the hanger, by reference numeral 514. As such, in this case, reference to a U-cup may be made by reference to one or more of sections 502, 504, unless otherwise indicated. FIG. 5 illustrates that the U-cup, including sections 502, 504, may be energized by an energizing ring (e-ring) 518 in the same manner as illustrated in FIG. 2. The e-ring 518 is provided to be pushed into place with the U-cup such that sections 502, 504 are pushed outwardly from the center of the U-cup. Presently, FIG. 5 illustrates the e-ring partly applied and illustrates that outer seal areas 510A, 510B, 512A, and 512B are not pressing against the surfaces of wellhead 516 and hanger surface 514. FIG. 10 provides an example of an e-ring when fully applied, along with high pressure energizing from below the e-ring that provides a second energizing and a second sealing. In an implementation, applied force and materials may be removed once the U-cup 502 is in place in the wellhead. Further, when energized (e.g., pressed into area 506 to position within the U-cup 502), the e-ring 518 causes the outer seal areas 510A, 510B, 512A, and 512B for the U-cup 506 to press against the housing 516 on one side and the casing hanger 514 on the other side, thereby providing high temperature and high pressure seals in four different locations similar to the illustrated example 200, 240 of FIG. 2, and as further illustrated with respect to the other figures in this case. This is generally a first energizing of the e-ring and it provides at least a first sealing of the U-cup with wellhead and the casing.

In FIG. 5, even after the first seal areas 510A, 510B of the U-cup 502 are energized using the above first energizing process with the e-ring, the lower seal areas 512A, 512B allow for further movement of the lower portion of the U-cup seal, because they incorporate notches 508A, 508B. The notches 508A, 508B are adjacent to respective seal areas 512A, 512B. In an example, the seal areas 512A, 512B are part of movable portions 520A, 520B of the U-cup formed as a result of the notches 508A, 508B. The movable areas 520A, 520B are movable even after the first energizing using the e-ring is completed because of the notches which allow for further protrusion of these features. Movable areas 520A, 520B are referred to generally as protruding lips elsewhere in this disclosure. In an implementation, fluid from beneath the seal is received in the notches 508A, 508B—throughout the circumference of the seal 502—and causes the movable portions including seal areas 512A, 512B to move outwardly from the center of the U-cup. This is additional movement that may not exist in seal portion 510A, 510B. This additional movement provides second energizing for the U-cup and provides second sealing of the U-cup with the wellhead and the casing. This is particularly useful when higher pressures exist below the seal which acts to further push, outwardly, the movable portions forming seal areas 512A, 512B.

FIG. 5 illustrates that pressure-energization of the seal 502 may be achieved by allowing pressurized fluid to travel behind or beneath the portion of the seal containing seal areas 512A, 512B. These seal areas are also herein referred to as sealing mechanisms, and may alternatively include bumps, wickers, grooves, o-rings, and smooth-flush faces. FIG. 5 illustrates the grooved faces in the seal areas 512A, 512B. As such, notches 508A, 508B may be appropriately provided so as to accentuate the location of the sealing mechanism—e.g., properly facing the inner diameter of a wellhead or surface of the casing hanger (e.g., similar wellhead and casing in FIG. 2). A fluid path formed by the notches 508A, 508B results in the seal mechanisms protruding outwardly to form a wing or a lip. When pressure acts on the wing or lip (the movable portions including seal areas 512A, 512B), the seal mechanism (including the seal areas 512A, 512B) is pressed into its corresponding mating surface on the wellhead or casing hanger. This maintains or increases the contact pressure between the seal and the hanger and wellhead, and thus preserves a robust seal between these structures. In addition, the seal 502 may be made of similar materials and from similar manufacturing processes as discussed with respect to the materials and the manufacturing processes used to form the seal 202 of FIG. 2.

Figure 6A:
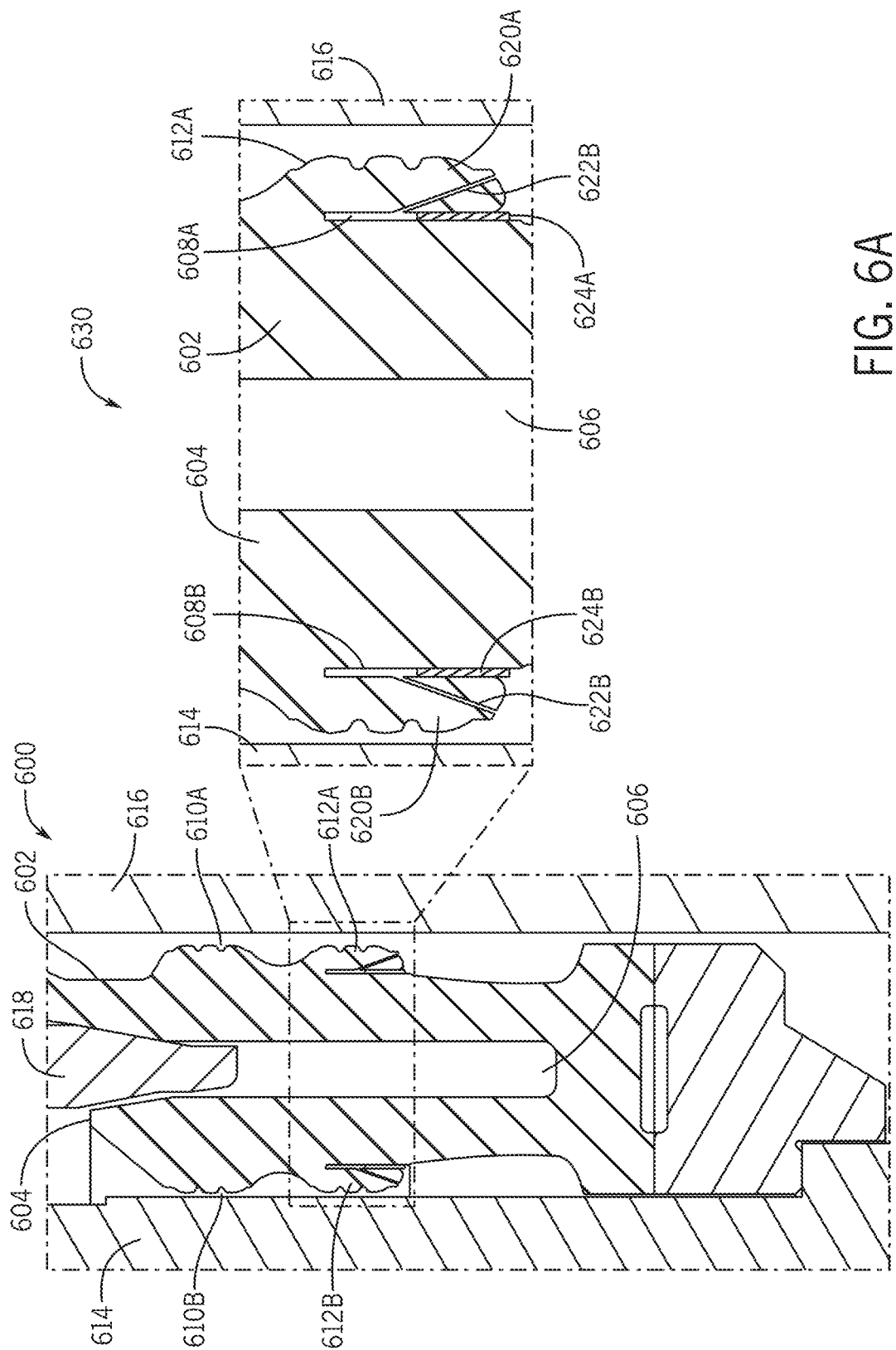
FIG. 6A illustrates an example of a seal including notches that defines movable portions, such as wings or lips, and at least an insert partly blocking part of a notch to provide variable stiffness to the seal, in accordance with aspects of this disclosure.

FIG. 6A illustrates another example 600, 630 of a seal utilizing the present notch and movable portion in accordance with an aspect of this disclosure. The seal in example 600, 630 may be a U-cup type with sections 602, 604 forming the U-cup. Example 630 is an exploded view of the marked section from example 600. Example 600 may represent an exploded cross sectional side view of the area between the casing hanger 114 and the housing of the wellhead 112. The housing of the wellhead is represented by reference numeral 616 and the hanger, by reference numeral 614. As such, in this case, reference to a U-cup may be made by reference to one or more of sections 602, 604, unless otherwise indicated. FIG. 6 illustrates that the U-cup, including sections 602, 604, may be energized by an energizing ring (e-ring) 618 in the same manner as illustrated in FIG. 2. The e-ring 618 is provided to be pushed into place with the U-cup such that sections 602, 604 are pushed outwardly from the center of the U-cup. Presently, FIG. 6A illustrates the e-ring partly applied and illustrates that outer seal areas 610A, 610B, 612A, and 612B are not pressing against the surfaces of wellhead 616 and hanger surface 614. FIG. 10 provides an example of an e-ring when fully applied, along with high pressure energizing from below the e-ring that provides a second energizing and a second sealing. In an implementation, applied force and materials may be removed once the U-cup 602 is in place in the wellhead. Further, when energized (e.g., pressed into area 606 to position within the U-cup 602), the e-ring 618 causes the outer seal areas 610A, 610B, 612A, and 612B for the U-cup 606 to press against the housing 616 on one side and the casing hanger 614 on the other side, thereby providing high temperature and high pressure seals in four different locations similar to the illustrated example 200, 240 of FIG. 2, and as further illustrated with respect to the other figures in this case. This is generally a first energizing of the e-ring and it provides at least a first sealing of the U-cup with wellhead and the casing.

In FIG. 6A, even after the first seal areas 610A, 610B of the U-cup 602 are energized using the above first energizing process with the e-ring, the lower seal areas 612A, 612B allow for further movement of the lower portion of the U-cup seal, because they incorporate notches 608A, 608B. In the case of FIG. 6A, the notches 608A, 608B are more like channels drilled into the seal 602. However, the notches 608A, 608B may also be a thin slit or groove sectioned into seal 602 at the areas illustrated. The notches 608A, 608B are adjacent to respective seal areas 612A, 612B. In an example, the seal areas 612A, 612B are part of movable portions 620A, 620B of the U-cup and are movable as a result of the notches 608A, 608B. The movable portions 620A, 620B are movable even after the first energizing using the e-ring is completed because the notches 608A, 608B allow for such movement. In addition, unlike in FIG. 5, FIG. 6A demonstrates multiple notches in each of reference numerals 608A, 608B. Particularly, because the notches 608A, 608B form channels, slits, or grooves, they direct fluid under pressure to an area behind movable portions 620A, 620B of the seal 602. At least a part of the notches 608A, 608B may be filled with an inserting material (or an insert) 624A, 624B such that the insert fits snugly into the notch opening. The insert acts as a spacer during the manufacturing process. This provides the movable portions 620A, 620B (forming the wing or lip) a shaped that has a predetermined amount of allowable movement or deflection (supported by the material of the insert added to the material of the seal), such that when a movement or a deflection occurs under pressure, then the wing or lip contacts the seal and forms a bridge. Such an aspect illustrates an altering of the stiffness of the seal for purposes of supporting the high pressure second energizing offered by fluid beneath the seal area.

In an implementation, fluid from beneath the seal is received in the notches 608A, 608B—throughout the circumference of the seal 602—and causes the movable portions including seal areas 612A, 612B to move outwardly from the center of the U-cup. Such fluid may not be received through the block caused by the insert 624A, 624B in their respective notch portions. Nevertheless, as there is a bypass channel or hole 622A, 622B (e.g., one or more drilled holes) to allow the fluid to enter behind the respective notch 608A, 608B, and behind the respective insert 624A, 624B, the movement of the movable portions 620A, 620B is still achieved. This is additional movement that may not exist in seal portion 610A, 610B. This additional movement provides second energizing for the U-cup and provides second sealing of the U-cup with the wellhead and the casing. This is particularly useful when higher pressures exist below the seal which acts to further push, outwardly, the movable portions forming seal areas 612A, 612B.

FIG. 6A illustrates that pressure-energization of the seal 602 may be achieved by allowing pressurized fluid to travel behind or beneath the portion of the seal containing seal areas 612A, 612B. These seal areas are also herein referred to as sealing mechanisms, and may alternatively include bumps, wickers, grooves, o-rings, and smooth-flush faces. FIG. 6 illustrates the grooved faces in the seal areas 612A, 612B. As such, notches 608A, 608B may be appropriately provided so as to accentuate the location of the sealing mechanism—e.g., properly facing the inner diameter of a wellhead or surface of the casing hanger (e.g., similar wellhead and casing in FIG. 2). A fluid path formed by the notches 608A, 608B results in the seal mechanisms protruding outwardly to form a wing or a lip. When pressure acts on the wing or lip (the movable portions including seal areas 612A, 612B), the seal mechanism (including the seal areas 612A, 612B) is pressed into its corresponding mating surface on the wellhead or casing hanger. This maintains or increases the contact pressure between the seal and the hanger and wellhead, and thus preserves a robust seal between these structures. In addition, the seal 602 may be made of similar materials and from similar manufacturing processes as discussed with respect to the materials and the manufacturing processes used to form the seal 202 of FIG. 2.

Figure 6B:
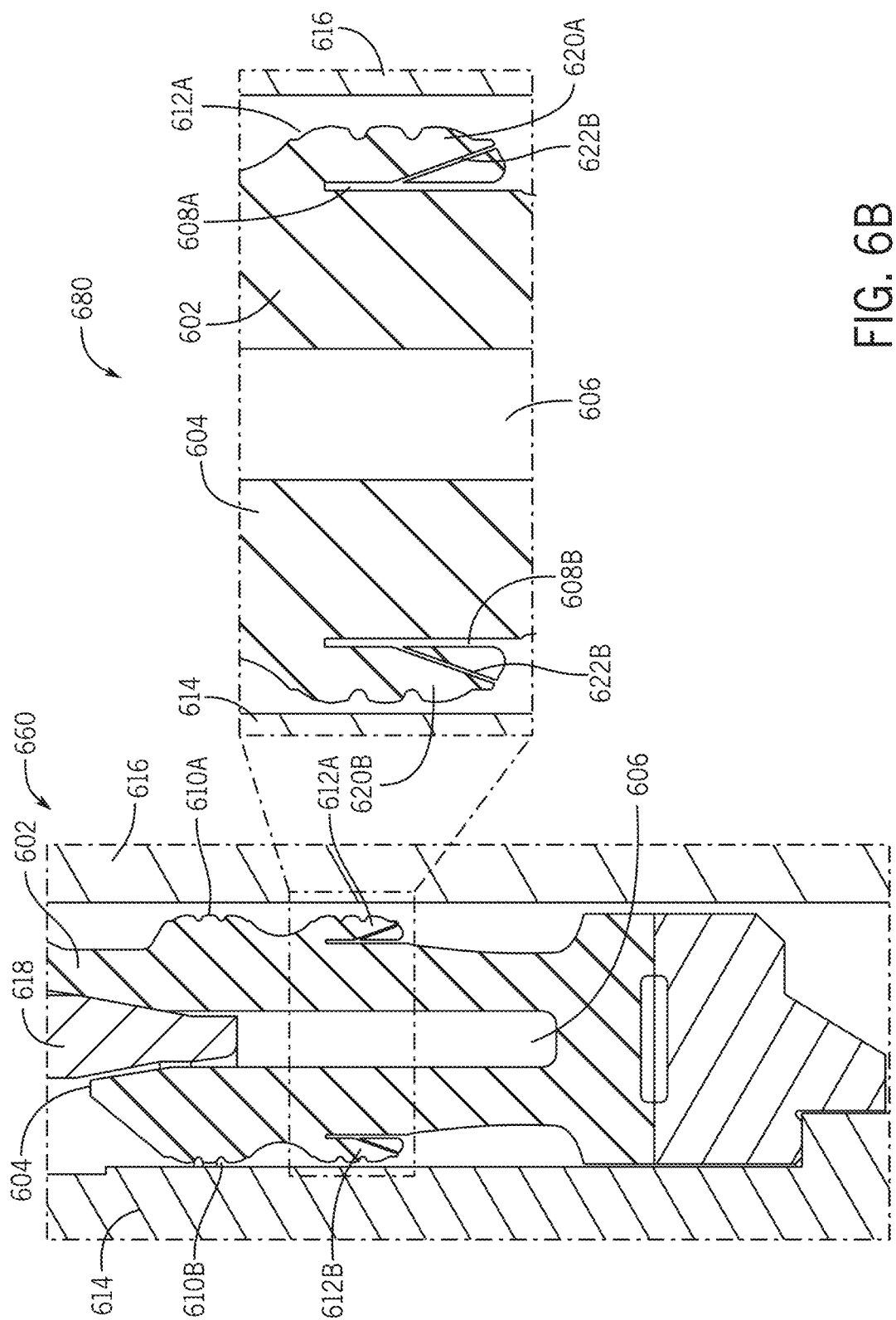
FIG. 6B illustrates yet another example of a seal similar to FIG. 6A, but does not include any insert blocking part of the notch, and which provides full stiffness afforded by the material of the seal outside the notches, in accordance with an aspect of this disclosure.

FIG. 6B illustrates another example 660, 680 of a seal utilizing the present notch and movable portion in accordance with an aspect of this disclosure. The seal in example 660, 680 may be a U-cup type with sections 602, 604 forming the U-cup similar to FIG. 6A. FIG. 6B differs in that FIG. 6B does not include inserts 624A, 624B blocking any part of the notches 608A, 608B. Instead, the portions are illustrated as open to receiving fluid as in reference numerals 626A, 626B. As such, the remaining discussion with respect to FIG. 6A is applicable here, including the reference numerals. Further, FIG. 6B may also be seen as similar to the example of FIG. 2 with the addition of a bypass channel, bypass notch, or hole to provide fluid into the notch.

Particularly, because the notches 608A, 608B form channels, slits, or grooves, they direct fluid under pressure to an area behind movable portions 620A, 620B of the seal 602. As no part of the notches 608A, 608B are filled or blocked, unlike FIG. 6A, the bypass channel, bypass notch, or hole 622A, 622B, together with the notches 608A, 608B allow fluid to be received being the notches 608A, 608B. This allows the desired fluid pressure to be attained and allows the movable portions 620A, 620B to fully expand and press the seal areas 612A, 612B further against the wellhead and the hanger. Such an aspect maintains the stiffness of the seal for purposes of supporting the high pressure second energizing offered by fluid beneath the seal area. Furthermore, the vertical notches 608A, 608B may also be referred to herein as a slot that is fully circumferential for the seal. While illustrated an angled slots 622A, 622B, these features may also be referred to as a communication hole. The communication hole may also be circumferential and is rotated about 1 degree from the vertical notches. The inserts 624A, 624B provided in the opening of the angled slots 622A, 622B to prevent the slot from collapsing when the seal is pushed into the wellhead and hanger during setting. This provides for the initial seal from preload. Subsequently, when fluid pressure builds in the angled slots 622A, 622B and the communication hole, the fluid pressure assists in adding expansion force for the seal. Furthermore, the angled slots 622A, 622B need not be circumferential and the fluid is communicated, through the communication hole that is circumferential, to different such angled slots 622A, 622B at various points in the circumference of the seal. This inserts 624A, 624B, therefore, provide stiffness in compression at the end of angled slots 620A, 620B.

Figure 7:
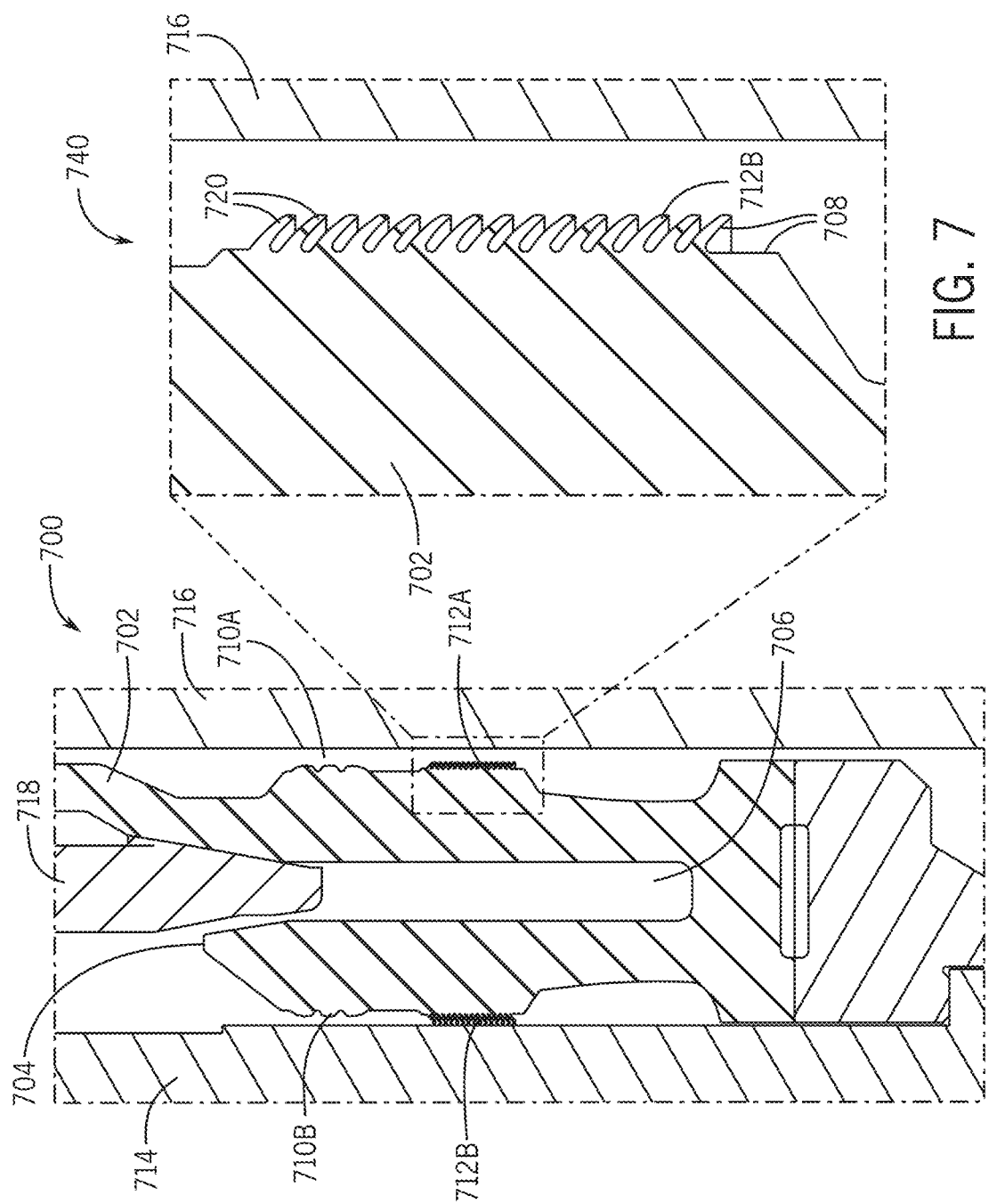
FIG. 7 illustrates a example of a seal with multiple protruding lips formed from multiple notches, in accordance with aspects of this disclosure.

FIG. 7 illustrates another example 700, 740 of a seal utilizing the present notch and movable portion in accordance with an aspect of this disclosure. Unlike the prior examples, however, there are multiple notches in FIG. 7 forming multiple protruding lips. The seal in example 700, 740 may be a U-cup type with sections 702, 704 forming the U-cup. Particularly, example 700 may represent an exploded cross sectional side view of the area between the casing hanger 114 and the housing of the wellhead 112. Example 740 is an exploded view of a portion of example 700. The housing of the wellhead is represented by reference numeral 716 and the hanger, by reference numeral 714. As such, in this case, reference to a U-cup may be made by reference to one or more of sections 702, 704, unless otherwise indicated. FIG. 7 illustrates that the U-cup, including sections 702, 704, may be energized by an energizing ring (e-ring) 718 in the same manner as illustrated in FIG. 2.

The e-ring 718 is provided to be pushed into place with the U-cup such that sections 702, 704 are pushed outwardly from the center of the U-cup. Presently, FIG. 7 illustrates the e-ring partly applied and illustrates that outer seal areas 710A, 710B, 712A, and 712B are not pressing against the surfaces of wellhead 716 and hanger surface 714. FIG. 10 provides an example of an e-ring when fully applied, along with high pressure energizing from below the e-ring that provides a second energizing and a second sealing. In an implementation, applied force and materials may be removed once the U-cup 702 is in place in the wellhead. Further, when energized (e.g., pressed into area 706 to position within the U-cup 702), the e-ring 718 causes the outer seal areas 710A, 710B, 712A, and 712B for the U-cup 706 to press against the housing 716 on one side and the casing hanger 714 on the other side, thereby providing high temperature and high pressure seals in four different locations similar to the illustrated example 200, 240 of FIG. 2, and as further illustrated with respect to the other figures in this case. This is generally a first energizing of the e-ring and it provides at least a first sealing of the U-cup with wellhead and the casing.

In FIG. 7, even after the first seal areas 710A, 710B of the U-cup 702 are energized using the above first energizing process with the e-ring, the lower seal areas 712A, 712B allow for further movement of the lower portion of the U-cup seal, because they incorporate notches 708 under each protrusion 720 of the seal areas 712A, 712B. The exploded view 740 shows only seal area 712A, but a person of ordinary skill would recognize that this area is available to seal area 712B as well. The notches 708 are adjacent to respective seal areas 712A, 712B, and form the respective protrusions 720. In an example, the seal areas 712A, 712B are the movable portions 720 of the U-cup 702 formed as a result of the notches 708. The movable areas 720 are movable even after the first energizing using the e-ring is completed because of the notches 708, which allow for further protrusion of these features in an upward direction, for instance. Movable areas 720 are referred to generally as protruding lips elsewhere in this disclosure. In an implementation, fluid from beneath the seal is received in the notches 708—throughout the circumference of the seal 702—and causes the movable portions including seal areas 712A, 712B to move outwardly from the center of the U-cup. This is additional movement that may not exist in seal portion 710A, 710B. This additional movement provides second energizing for the U-cup and provides second sealing of the U-cup with the wellhead and the casing. This is particularly useful when higher pressures exist below the seal which acts to further push, outwardly, the movable portions forming seal areas 712A, 712B (in this case, also referenced by movable portions 720).

FIG. 7 illustrates that pressure-energization of the seal 702 may be achieved by allowing pressurized fluid to travel behind or beneath the portion of the seal containing seal areas 712A, 712B. These seal areas are also herein referred to as sealing mechanisms, and may alternatively include bumps, wickers, grooves, o-rings, and smooth-flush faces. FIG. 7 illustrates the grooved faces in the seal areas 712A, 712B. As such, notches 708 are on the seal and not the surface, and may be appropriately provided so as to accentuate the location of the sealing mechanism—e.g., properly facing the inner diameter of a wellhead or surface of the casing hanger (e.g., similar wellhead and casing in FIG. 2). A fluid path formed by the notches 708 results in the seal mechanisms protruding outwardly to form a wing or a lip. When pressure acts on the wing or lip (the movable portions 720 forming seal areas 712A, 712B), the seal mechanism (including the seal areas 712A, 712B) is pressed into its corresponding mating surface on the wellhead or casing hanger. This maintains or increases the contact pressure between the seal and the hanger and wellhead, and thus preserves a robust seal between these structures. In addition, the seal 702 may be made of similar materials and from similar manufacturing processes as discussed with respect to the materials and the manufacturing processes used to form the seal 202 of FIG. 2.

Figure 8:
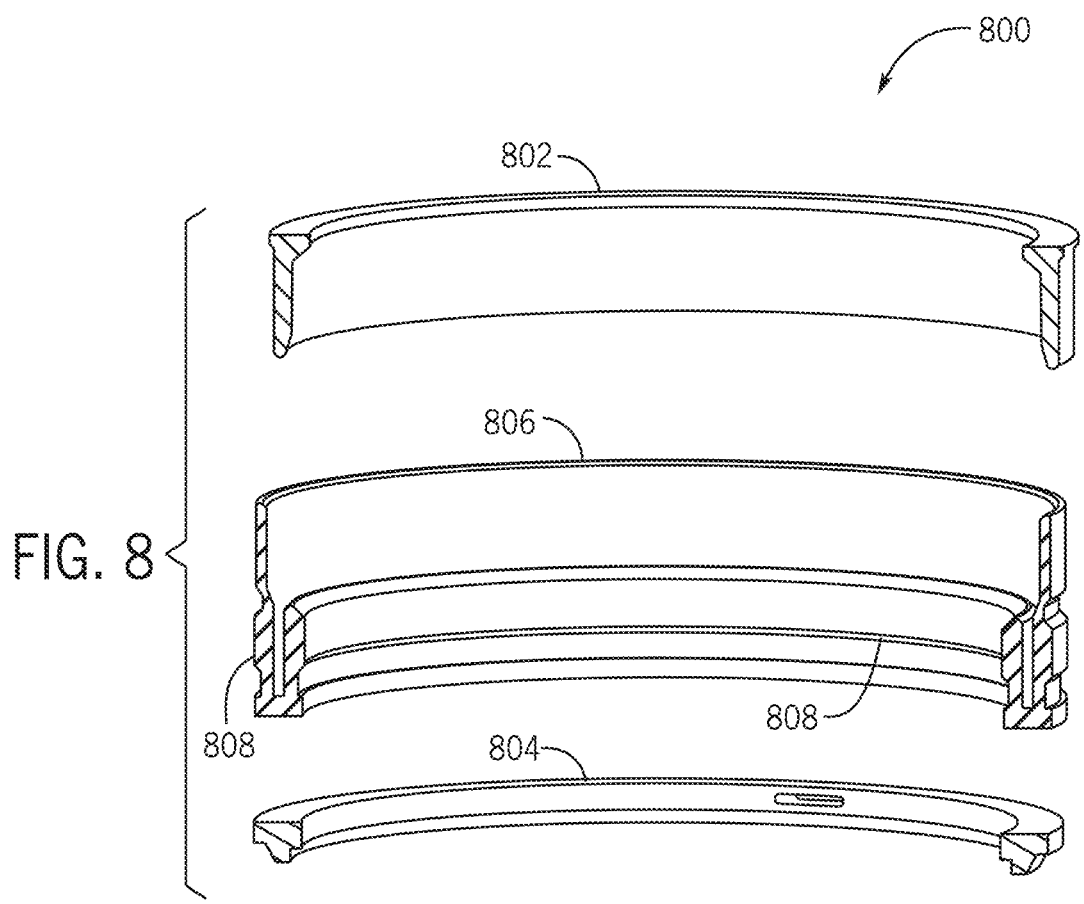
FIG. 8 illustrates examples of cross-section perspective views of an e-ring and a seal applicable for notching and creating the wings or lips, in accordance with aspects of this disclosure.

FIG. 8 illustrates example seals and related energizing elements 900 in accordance with another aspect of this disclosure The wellhead annulus seal 806, which is a general representation of the example U-cups in FIGS. 2-8 and 10, may be applicable for the present implementation and may be applied in subsea as well as in surface applications. FIG. 8 also illustrates external and internal seal bands or ribs 808 for allowing higher temperature and high pressure sealing against the hanger of the wellhead on the internal seal bands or ribs, and to the housing of the wellhead on the external seals bands or ribs (e.g., at the top outside portions of the seal 806). As such, when reference is made to the first seal or the second seal against one of the housing and the hanger, a person of ordinary skill would recognize that the sealing or holding of the seal bands or ribs (of the first seal or the second seal) is being discussed in this context unless explicitly stated otherwise. In addition, the lower portion of each of the first seal and the second seal incorporates the movable portions as illustrated in FIGS. 2-8, and 9. In the example in FIG. 8, the seal 806 may be a metal-to-metal (MS) seal forming a U-cup structure with an energizing ring or e-ring 802 applied to energize the seal in its position in the wellhead and against the hanger. Lock ring energizer 804 is provided for the below portion of the U-cup seal 806. The wellhead may require multiple such U-cups of different internal diameters as to the drill pipe narrows. Further, in an aspect of the disclosure, the U-cup in each of FIGS. 2-9 is formed of a corrosion resistant alloy (CRA). The CRA may be a special alloy seal, stainless steel, or nickel alloy capable of high pressure and high temperature metal-to-metal sealing. This U-cup could also be made of low allow steel or similar metallic material.

Figure 9:
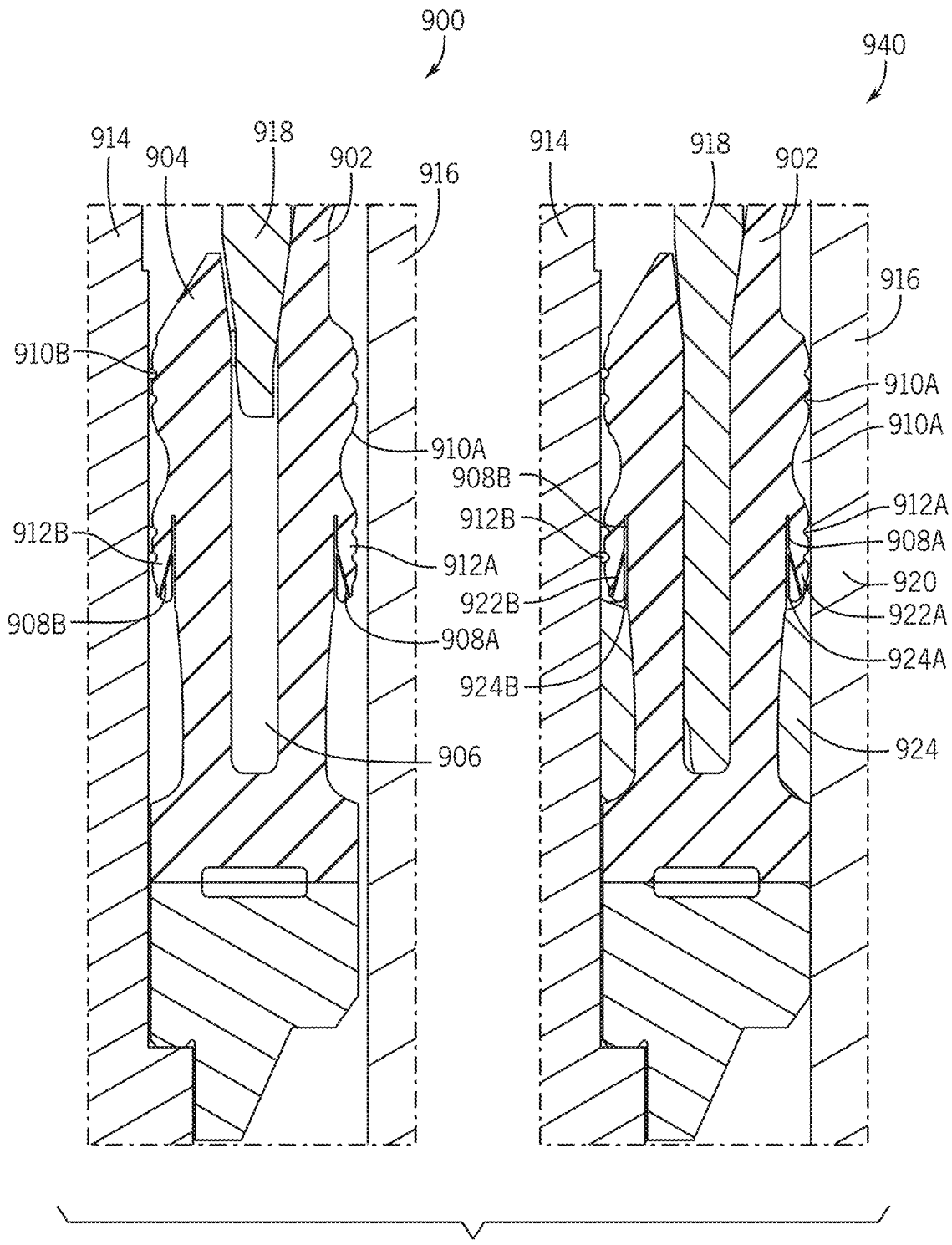
FIG. 9 illustrates cross-section views of application of an e-ring in a partial position and in complete energizing position, as to the example seal from FIG. 6A, in accordance with an aspect of this disclosure.

FIG. 9 illustrates examples 900, 940 of a seal without energizing and with energizing using a first energizing from an e-seal and a second energizing from fluid pressure below the seal. Example 900 is similar to example 600 of FIG. 6A. Here, like in FIG. 6A, the seal 902 may be a U-cup type with sections 902, 904 forming the U-cup. Examples 900, 940 may represent exploded cross sectional side views of the area between the casing hanger 114 and the housing of the wellhead 112. The housing of the wellhead is represented by reference numeral 916 and the hanger, by reference numeral 914. As such, in this case, reference to a U-cup may be made by reference to one or more of sections 902, 904, unless otherwise indicated. FIG. 9 illustrates that the U-cup, including sections 902, 904, may be energized by an energizing ring (e-ring) 918 in the same manner as illustrated in FIG. 2. The e-ring 918 is provided to be pushed into place with the U-cup such that sections 902, 904 are pushed outwardly from the center of the U-cup. Presently, example 900 of FIG. 9 illustrates the e-ring partly applied and illustrates that outer seal areas 910A, 910B, 912A, and 912B are not pressing against the surfaces of wellhead 916 and hanger surface 914.

Example 940 of FIG. 9 provides an example of an e-ring 918 when fully applied, along with high pressure energizing by fluid 924 from below the e-ring 918 that provides a second energizing and a second sealing at seal areas 912A, 912B using movable portions 920, for instance. Inserts 924A, 924B, in respective notches 908A, 908B, provide a variable stiffness to the movable portions 920 of the seal. The movable portion 920 is throughout the circumference of the seal, as will be readily understood by a person of ordinary skill reading the present disclosure. Bypass holes or channels 922A, 922B are provided when such an insert 924A, 924B is used so that the fluid can still reach the notch area 908A, 908B behind each of the movable portions 920 and behind each of the insert 924A, 924B. In an implementation, applied force and materials may be removed once the U-cup 902 is in place in the wellhead. Further, when energized (e.g., pressed into area 906 to position within the U-cup 902), the e-ring 918 causes the outer seal areas 910A, 910B, 912A, and 912B for the U-cup 906 to press against the housing 916 on one side and the casing hanger 914 on the other side, thereby providing high temperature and high pressure seals in four different locations similar to the illustrated example 200, 240 of FIG. 2, and as further illustrated with respect to the other figures in this case. The sealing provided only by the e-ring 918 is generally a first energizing of the e-ring as it provides at least a first sealing of the U-cup with wellhead and the casing.

Even after the first seal areas 910A, 910B of the U-cup 902 are energized using the above first energizing process with the e-ring 918, the lower seal areas 912A, 912B allow for further movement of the lower portion of the U-cup 902, because they incorporate notches 908A, 908B. The notches 908A, 908B are adjacent to respective seal areas 912A, 912B. In an example, the seal areas 912A, 912B are movable portions of the U-cup or are part of movable portions 920, as a result of the notches 908A, 908B, even after the first energizing using the e-ring 918 is completed. While FIG. 9 shows only one side with reference numeral 920 (as including seal area 912A), it is understood to person of ordinary skill reading the present disclosure that seal area 912B also is part of its own movable surface. In an implementation, fluid from beneath the seal is received in the notches 908A, 908B—throughout the circumference of the seal 902—and causes the movable portions including seal areas 912A, 912B to move outwardly from the center of the U-cup. This is additional movement that may not exist in seal portion 910A, 910B. This additional movement provides second energizing for the U-cup and provides second sealing of the U-cup with the wellhead and the casing. This is particularly useful when higher pressures exist below the seal which acts to further push, outwardly, the movable portions forming seal areas 912A, 912B. In addition, other discussion from FIG. 6A is applicable to at least example 900.

FIG. 10 illustrates an example process flow 1000 using seals that may be U-cups in accordance with aspects herein. Sub-process 1002 provides a seal for use between a hanger and a wellhead. Sub-process 1004 provides one or more notches in one or more sides of the seal. As described elsewhere in this case, such notches may be provided by lath turning, face grooving, electrical discharge machining (EDM), 3D printing, material forming processes, and rolling. The notches may be created during 3D-printing as a feature of the 3D-printing mechanism. Further such notches then define movable portions of the seal Similar features might also be applied to other locations of a seal to enhance performance in other load cases. Sub-process 1006 provides first energizing to the seal using the e-ring described throughout this disclosure. The first energizing is such that an outer side of the seal presses against an internal diameter of the wellhead on one side and an inner side of the seal presses against a surface of the hanger, thereby providing a first seal for the wellhead. Fluid is received in the one or more notches via sub-process 1008. For example, fluid is received from below the seal to pressurize an area behind (and optionally, under) the one or more notches. Sub-process 1010 is an optional feature of the manufacture of the seals to adjust the stiffness of the seal—as demonstrated in the example seals of FIGS. 6A and 6B. Particularly, once the fluid is at a pressure exceeding a portion of the stiffness of the seal, it is sufficient to cause movement for the one or more movable portions. As such, sub-process 1010 allows such buildup of pressure behind (and optionally, under) the notch to a value to overcome the stiffness of the seal. In sub-process 1012, once an intended pressure is achieved the movement of the seal occurs. The one or more movable portions are enabled to press against the internal diameter of the wellhead and the hanger surface, thereby providing a second sealing for the wellhead. The second sealing is, therefore, based at least in part on the pressurization of the area behind (and optionally, under) the one or more notches.

The specification and drawings are, accordingly, to be regarded in an illustrative rather than a restrictive sense. It will, however, be evident that various modifications and changes may be made thereunto without departing from the broader spirit and scope of the invention as set forth in the claims. Further, any of the many embodiments disclosed here may be combined by a person of ordinary skill using the present disclosure to understand the effects of such combinations.

What is claimed is:

1. A metal-to-metal (MS) seal for a wellhead, comprising:
   two sides;
   an area between the two sides to receive an energizing element; and
   one or more slits on at least one of the two sides to change a stiffness of the MS seal and to enable at least one movable portion for the at least one of the two sides, the one or more slits to allow fluid from a lower area relative to the MS seal to cause the at least one movable portion to extend towards a wall of the wellhead and to form a first seal with at least one portion of the wellhead.

2. The MS seal of claim 1, wherein the energizing element is adapted to cause the at least one movable portion to form a second seal with the at least one portion of the wellhead.

3. The MS seal of claim 1, wherein the one or more slits are disposed vertically with respect to an alignment of the MS seal in the wellhead or disposed in an angle with respect to the alignment of the MS seal in the wellhead.

4. The MS seal of claim 1, wherein a first one of the two sides is adapted to be against a side of the wellhead and a second one of the two sides is adapted to be against a hanger of the wellhead.

5. The MS seal of claim 4, wherein the one or more slits are located at a lower portion of the at least one of the two sides.

6. The MS seal of claim 4, wherein a first one of the two sides is comprised of an upper portion and a lower portion, and wherein the first one of the two sides has a higher overall height than a second one of the two sides.

7. The MS seal of claim 1, wherein the two sides comprise bumps, wickers, or grooves therein to engage with the wellhead or a hanger.

8. The MS seal of claim 1, wherein a material of the MS seal is comprised an alloy seal, stainless steel, or nickel alloy, the material adapted for high pressure and high temperature metal-to-metal sealing.

9. The MS seal of claim 1, wherein the one or more slits further comprise at least one channel extending around a circumference of the MS seal.

10. A method of manufacturing a metal-to-metal (MS) seal, comprising:
    forming a circumferential metal ring having an area between two sides of the circumferential metal ring, the area to receive an energizing element; and
    machining one or more slits on at least one of the two sides to change a stiffness of the MS seal and to enable at least one movable portion for the at least one of the two sides, the one or more slits to allow fluid from a lower area relative to the MS seal to cause the at least one movable portion to extend towards a wall of the wellhead and to form a first seal with at least one portion of the wellhead.

11. The method of claim 10, wherein the energizing element is adapted to cause the at least one movable portion to form a second seal prior to the first seal.

12. The method of claim 10, wherein the machining of the one or more slits enables a vertical disposition of the one or more slits with respect to an alignment of the MS seal in the wellhead or enables an angled disposition for the one or more slits with respect to the alignment of the MS seal in the wellhead.

13. The method of claim 10, wherein the machining is one or more of: a lathe turning operation, a face grooving operation, an electrical discharge machining (EDM), a three-dimensional (3D) printing, a material forming operation, and a rolling operation.

14. The method of claim 10, further comprising:
positioning a spacer between the one or more slits to achieve a predetermined amount of movement for the movable portions representing a change in the stiffness of the MS seal; and
drilling a channel to connect the one or more slits, the channel to comprise the fluid to enable the predetermined amount of movement for the movable portions.

15. The method of claim 10, further comprising:
drilling at least one channel around a circumference to connect the one or more slits, the at least one channel to allow the fluid to fill around the circumference to enable the MS seal to form a third seal with the wellhead.

16. A method of sealing a wellhead, comprising:
positioning, in a first position in the wellhead and between the wellhead and a hanger, a circumferential metal ring having an area between two sides, the area to receive an energizing element, the circumferential metal ring to comprise at least one slit on at least one of the two sides, the slit to change a stiffness of the circumferential metal ring;
energizing the circumferential metal ring using the energizing element to achieve a second position, in the wellhead, for the circumferential metal ring, the energizing to cause at least one movable portion enabled by the slit to form a first seal between the wellhead and the hanger; and
allowing fluid from a lower area of the wellhead to cause the at least one movable portion to extend towards a wall of the wellhead, the at least one movable portion to form a second seal between the wellhead and the hanger.

17. The method of claim 16, further comprising:
enabling the fluid to reach a predetermined pressure to achieve the second seal.

18. The method of claim 16, wherein the energizing element is an e-ring having a taper shape to energize the circumferential metal ring.

19. The method of claim 16, wherein the circumferential metal ring is a U-cup having the two sides and having the area disposed in a U-shape in between the two sides.

20. The method of claim 16, wherein the at least one of the two sides is textured by forming bumps, wickers, or grooves on the at least one of two sides.

* * * * *